United States Patent [19]
Karube et al.

[11] Patent Number: 5,461,636
[45] Date of Patent: Oct. 24, 1995

[54] TURBO BLOWER FOR LASERS

[75] Inventors: Norio Karube, Machida; Yasuyuki Morita, Yamanashi; Kenji Nakahara, Yamanashi; Kenji Mitsui, Yamanashi, all of Japan

[73] Assignee: Fanuc Ltd., Minamitsuru, Japan

[21] Appl. No.: 366,696

[22] Filed: Dec. 30, 1994

[30] Foreign Application Priority Data

| Jan. 24, 1994 | [JP] | Japan | 6-005768 |
| Jan. 25, 1994 | [JP] | Japan | 6-006453 |
| Jan. 25, 1994 | [JP] | Japan | 6-006454 |
| Jan. 25, 1994 | [JP] | Japan | 6-006455 |
| Jan. 25, 1994 | [JP] | Japan | 6-006456 |

[51] Int. Cl.$^6$ ................................................ H01S 3/22
[52] U.S. Cl. ................................ 372/58; 372/61; 372/98
[58] Field of Search ............................ 372/98, 58, 59, 372/61

[56] References Cited

U.S. PATENT DOCUMENTS

| 5,060,238 | 10/1991 | Karube et al. | 372/58 |
| 5,111,474 | 5/1992 | Funakubo et al. | 372/58 |
| 5,124,997 | 6/1992 | Funakubo et al. | 372/58 |
| 5,317,579 | 5/1994 | Adsett | 372/98 |

Primary Examiner—Leon Scott, Jr.
Attorney, Agent, or Firm—Staas & Halsey

[57] ABSTRACT

There is provided a turbo blower for lasers which is capable of effectively cooling a shaft and bearings thereof. Oil held in a shaft support member is drawn up via an oil inlet port by a centrifugal force generated by rotation of the shaft, and passes through a cooling oil passage extending through the shaft to be discharged from an oil outlet port provided below an upper one of rolling bearings as the bearings. The oil discharged from the outlet port returns via an oil return passage to an oil sump. While passing through the oil return passage, the oil is cooled by a coolant circulating through an coolant passage. Further, part of the oil discharged from the oil outlet port is supplied to the upper one of the bearings for lubrication. On the other hand, part of the oil held within the shaft support member is drawn up along a tapered portion of an oil suction head by the centrifugal force generated by rotation of the oil suction head for lubrication of a corresponding one of the rolling bearings. A large amount of oil flowing through the cooling oil passage can deprive the shaft and the rotor of heat, thereby effectively cooling the bearings as well.

18 Claims, 6 Drawing Sheets

TURBO BLOWER FOR LASERS

BACKGROUND OF THE INVENTION

1. Field of the Invention

This invention relates to a turbo blower for a gas laser for forcibly circulating laser gas through the gas laser, and more particularly to a turbo blower which has prolonged service life of bearings used therein.

2. Description of the Related Art

Recent carbon dioxide lasers ($CO_2$ laser oscillators) of a fast axial flow type are compact in size and capable of generating a high-quality laser beam with high power output. They are widely used in laser beam machining applications, such as cutting of metal and nonmetal materials, welding of metal materials, and so forth. Especially, some of them are rapidly developing as CNC laser beam machines associated with CNC (Computer Numerical Control) systems for use in machining fields requiring high-speed and high-accuracy cutting of complicated shapes.

In a carbon dioxide laser, about 20% of the applied electric energy is converted into a laser beam and the rest is consumed to heat the laser gas. On the other hand, theoretically, the gain of the laser oscillation is proportional to the minus (3/2) th power of the absolute temperature T, which makes it necessary to forcibly cool the laser gas to a temperature as low as possible to increase the oscillation efficiency. To this end, in a carbon dioxide laser of a fast axial flow type, a turbo blower is used for forcibly circulating the laser gas in the laser to cause the laser gas to pass through a cooling unit.

FIG. 6 shows the construction of a conventional turbo blower 100A for lasers. The turbo blower 100A illustrated in the figure has a turbo impeller 1A mechanically connected to a shaft 80 by a nut 7A. The shaft 80 has a rotor 3A rigidly mounted on the periphery thereof by shrink fit. A stator 4A is provided around the rotor 3A. The stator 4A is fixed to a housing 120, and constitutes a high-frequency motor 30A together with the rotor 3A. The turbo impeller 1A is rotated by the high-frequency motor 30A at a speed of several tens of thousands of rpm.

The shaft 80 is rotatably supported by a pair of rolling bearings 50 and 60 arranged on both sides of the high-frequency motor 30A. For lubrication of the rolling bearings 50 and 60, grease is used. Further, the shaft 80 has radiating fins 63 and 64 rigidly mounted thereon by shrink fit for cooling the bearings.

In the turbo blower 100A constructed as above, the laser gas is drawn therein in the direction of an arrow 9A in FIG. 6, and discharged in the direction of an arrow 10A, i.e. in a centrifugal direction.

The conventional turbo blower 100A rotates at a high speed of several tens of thousands of rpm, as described above, which causes a fairly large amount of heat to be generated in the motor 30A and the shaft 80. The heat is mainly ascribed to core loss and copper loss caused by magnetic flux of revolving magnetic field. On the other hand, the turbo blower 100A only contains a thin laser gas at about 0.1 atmospheric pressure. Therefore, cooling effects of natural convection cannot be expected, while effects of forced cooling by the radiating fins 63 and 64 are not sufficient.

Therefore, heat generated in the rotor 3A and the shaft 80 propagates to the rolling bearings 50 and 60 without being sufficiently dissipated. When the rolling bearings 50 and 60 are thus heated to a high temperature, grease charged therein is deteriorated, eventually causing seizure of the bearings, giving damage thereto.

Further, a rise in temperature of the rolling bearings 50 and 60 accelerates evaporation of grease, and a portion of the resulting grease vapor is mixed with the laser gas to contaminate optical components of the carbon dioxide laser. The contamination of the optical components brings about problems of decrease in power output of the laser and defective machining characteristics thereof resulting from a deformed laser beam generated thereby.

Further, since the radiating fins 63 and 64 are provided on the shaft 80 for cooling the bearings, the overall length of the shaft 80 is increased by an amount corresponding to the radiating fins 63 and 64. Therefore, the rotational speed of the turbo impeller 1A should clear both a first-order resonance point (critical speed) and a second-order resonance point (critical speed) before it reaches its maximum, and hence a damping structure has to be provided to suppress the vibration occurring at these resonance points. Further, in correcting the balance of rotating elements, such as the turbo impeller 1A and the like, a very large amount of labor is required for securing proper accuracy, which results in poor workability of the turbo blower in assembly and maintenance thereof.

SUMMARY OF THE INVENTION

The present invention has been made in view of these circumstances, and an object thereof is to provide a turbo blower for a laser, which is capable of effectively cooling a shaft and bearings used therein.

Another object of the invention is to provide a turbo blower for a laser, which is capable of properly supplying oil to bearings used therein.

Another object of the invention is to provide a turbo blower for a laser, which is capable of sufficiently cooling oil for lubrication of bearings used therein.

Another object of the invention is to provide a turbo blower for a laser, which is capable of reliably capturing foreign matters mixed in oil for lubricating bearings used therein.

To attain the above objects, the present invention provides a turbo blower for a laser, including a turbo impeller, a shaft having the turbo impeller fixed on one end thereof, a pair of bearings for rotatably supporting the shaft, and a motor for causing rotation of the shaft. The turbo blower is characterized by comprising a cooling oil passage formed through the shaft substantially along the axis thereof, and an oil sump arranged on one end side of the cooling oil passage such that the one end of the cooling oil passage is in contact with cooling oil existing within the oil sump.

The cooling oil passage is formed through the shaft along the axis thereof, and the oil sump is arranged on one end side of the cooling oil passage. The one end of the cooling oil passage is in contact with the cooling oil within the oil sump.

The oil in contact with the one end of the cooling oil passage moves through the cooling oil passage with rotation of the shaft as if it is pumped up, and then is discharged from the other end of the cooling oil passage. That is, the cooling oil is caused to pass through the shaft. As a result, the shaft is effectively cooled from within by the cooling oil.

The above and other objects, features and advantages of the present invention will become apparent from the fol-

DESCRIPTION OF THE PREFERRED EMBODIMENTS

The invention will now be described in detail with reference to drawings showing preferred embodiments of the invention.

Figure 1:
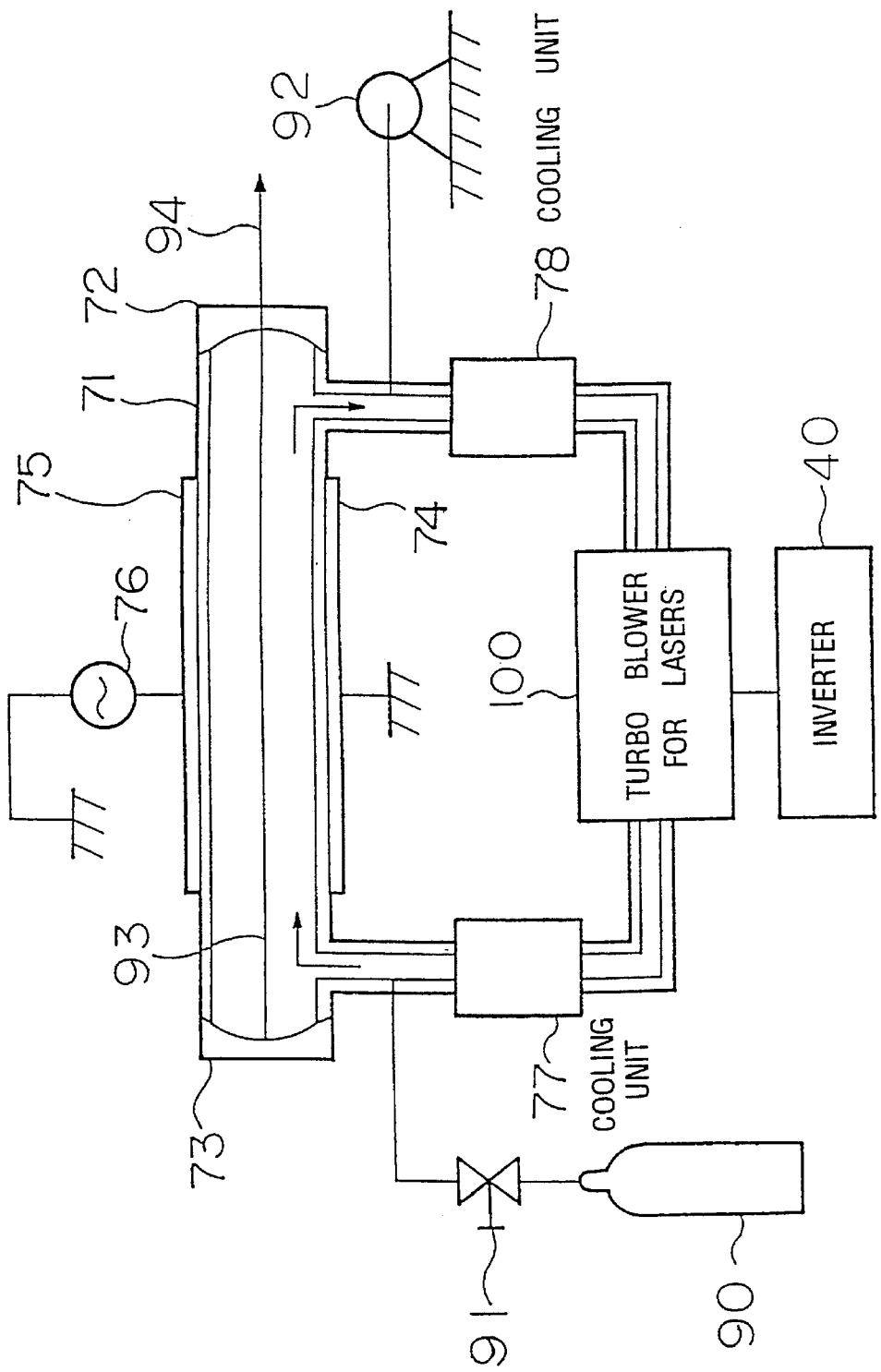
FIG. 1 is a block diagram showing the whole arrangement of a carbon dioxide laser incorporating a turbo blower for lasers, according to the invention.

Referring first to FIG. 1, there is shown the whole arrangement of a carbon dioxide laser incorporating a turbo blower for lasers, according to the invention. In the figure, an electric discharge tube 71 has opposite ends thereof closed by an output coupling mirror 72 and a total reflection mirror 73 which constitute an optical oscillator. Metal electrodes 74 and 75 are mounted on the periphery of the electric discharge tube 71. The metal electrode 74 is grounded, while the metal electrode 75 is connected to a high-frequency power supply 76, and when a high-frequency voltage is applied between the metal electrodes 74 and 75 from the high-frequency power supply 76, a high-frequency glow discharge is produced in the electric discharge tube 71 for laser excitation. The laser excitation generates a laser beam 93, and part of the laser beam 93 is emitted out via the output coupling mirror 72 as a laser beam 94.

To start the gas laser, a gas within the whole laser is first evacuated by a vacuum pump 92, and then a valve 91 is opened to introduce a predetermined amount of laser gas from a gas container 90 into the laser until the pressure of the gas in the laser reaches a predetermined level. Subsequently, the laser is continuously evacuated by the vacuum pump 92 and continuously replenished with the laser gas through the valve 91. The laser gas in the laser is therefore continuously replaced with a fresh gas while the gas pressure in the laser is kept at the predetermined level, and accordingly, contamination of the laser gas in the laser is prevented.

Further, in FIG. 1, the laser gas is circulated in the laser by a turbo blower 100 for lasers, whereby the laser gas is cooled. In general, with a carbon dioxide ($CO_2$) laser, about 20% of the applied electric energy is converted into a laser beam and the rest is consumed to heat the laser gas. On the other hand, theoretically, the gain of the laser oscillation is proportional to the minus(3/2)th power of the absolute temperature T. Therefore, it is necessary to forcibly cool the laser gas to increase the oscillation efficiency.

In the illustrated laser, the laser gas flows through the electric discharge tube 71 in the direction indicated by the arrows at a speed higher than about 200 m/sec., and is introduced into a cooling unit 78. The cooling unit 78 removes most of the heat energy produced by electric discharge within the electric discharge tube 71 from the laser gas. Then, the turbo blower 100 compresses the cooled laser gas. To remove the heat generated by the compression, the laser gas from the turbo blower 100 is passed through a cooling unit 77 before it is again introduced into the electric discharge tube 71. The cooling units 77 and 78 are well known in the art, and therefore detailed description thereof is omitted.

The turbo blower 100 is driven by an inverter 40. The rotational speed of the turbo blower 100 should become as high as several tens of thousands of rpm, and hence a high-frequency inverter is used to meet such requirement of a high rotational speed of the turbo blower 100.

Figure 2:
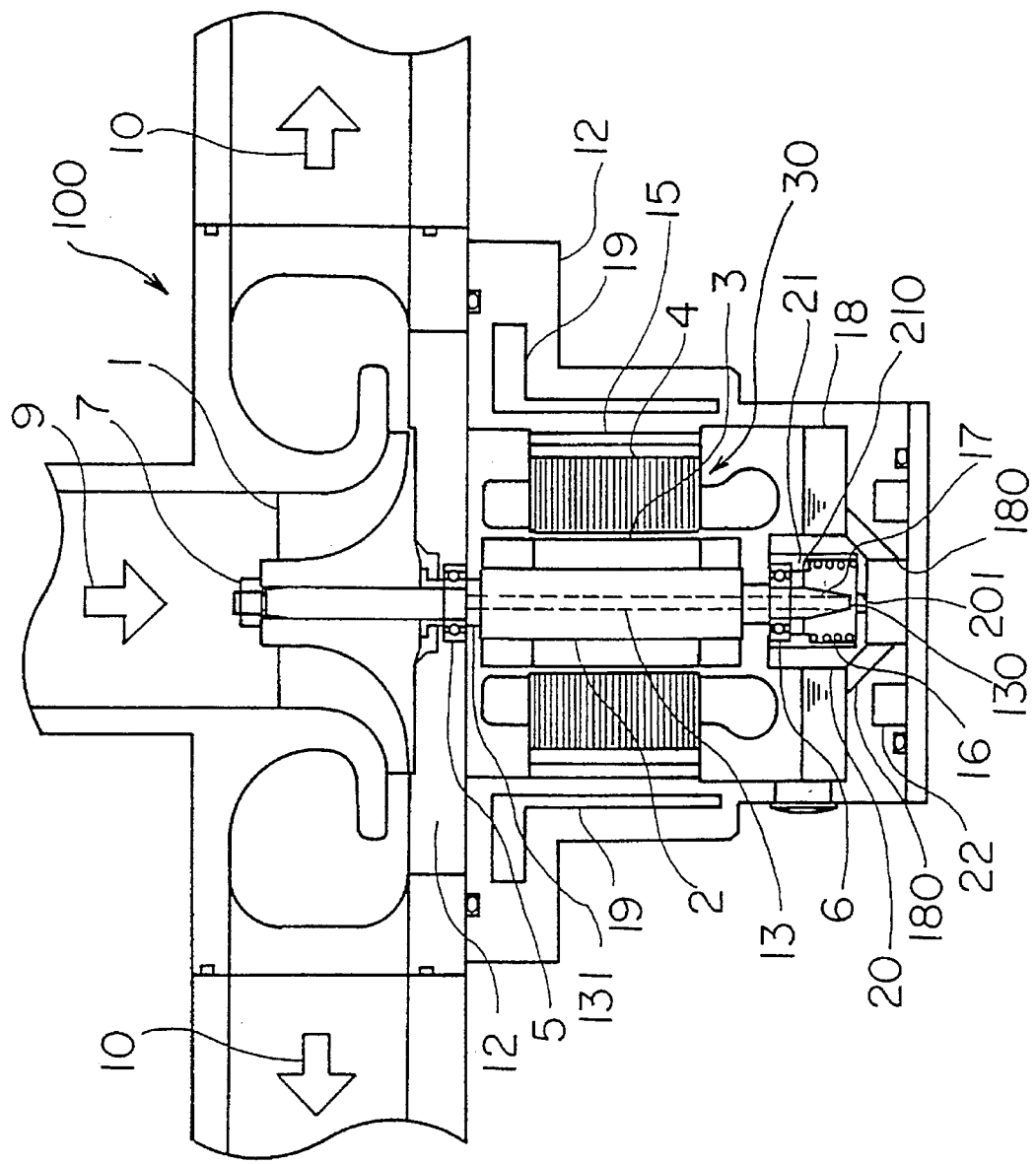
FIG. 2 is a block diagram showing the construction of a turbo blower for lasers, according to a first embodiment of the invention.

FIG. 2 shows the construction of a turbo blower for lasers, according to a first embodiment of the invention. In the figure, the turbo blower 100 is installed vertically, i.e. with its rotational axis extending in a vertical direction, and the laser gas is introduced from the cooling unit 78 (in FIG. 1) in the direction indicated by an arrow 9, and divided into two flows which are discharged in respective centrifugal directions indicated by arrows 10. The two flows of the laser gas finally join to form a single flow which enters the cooling unit 77 shown in FIG. 1.

The turbo blower 100 is arranged vertically, as stated above, and hence a shaft 2 extends in a vertical direction. The shaft 2 supports the turbo impeller 1 for rotation, with both these component parts being mechanically connected or rigidly fixed to each other by a nut 7. The shaft 2 has a rotor 3 rigidly fixed on the periphery thereof by shrink fit. Around the rotor 3 is provided a stator 4 which is fixed to a housing 120. The rotor 3 and the stator 4 constitute a high-frequency motor 30. The turbo impeller 1 is rotated by the high-frequency motor 30 at a speed of several tens of thousands of rpm. A pair of rolling bearings 5 and 6 are arranged on both sides of the high-frequency motor 30 for rotatably supporting the shaft 2.

Figure 3:
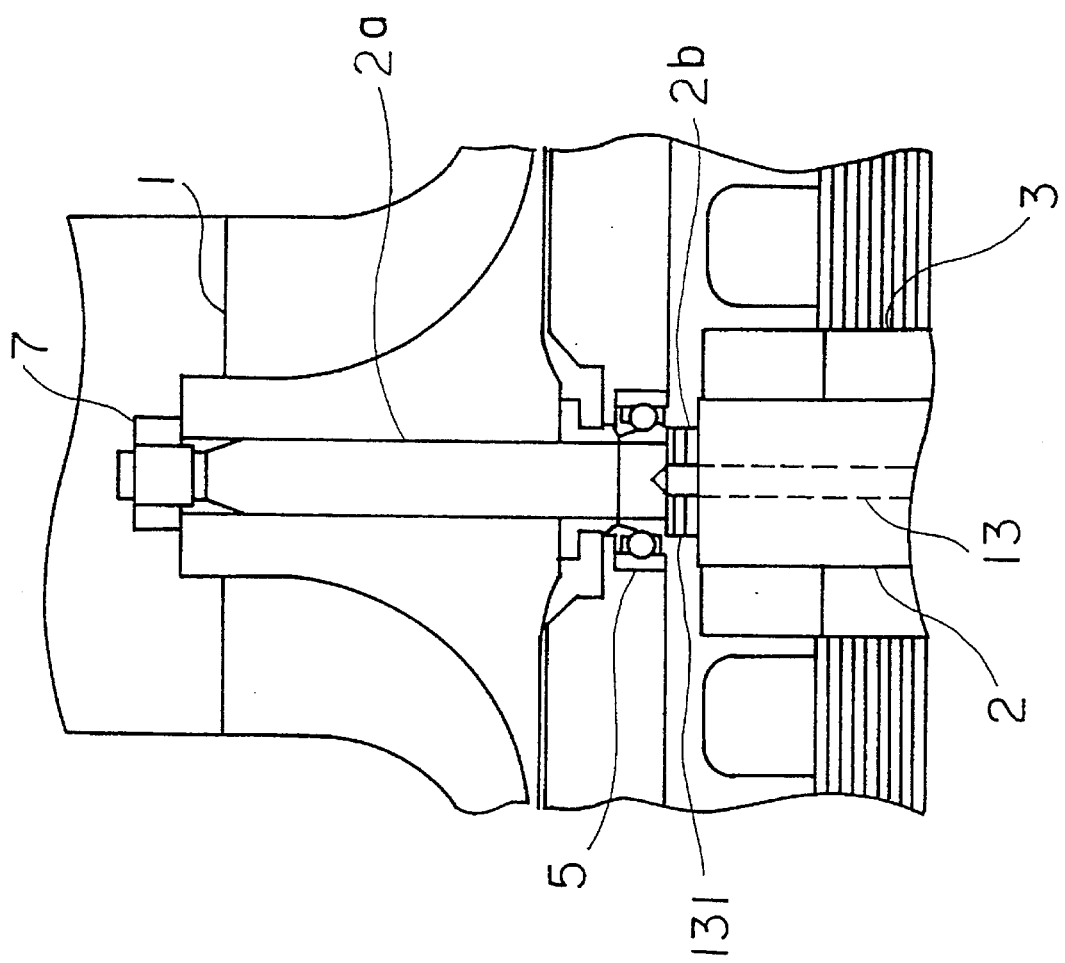
FIG. 3 is a diagram showing details of an oil outlet port appearing in FIG. 2.

FIG. 3 shows details of oil outlet ports 131 and their environment of the turbo blower 100. The shaft 2 is formed therethrough with a cooling oil passage 13 part of which extends along its axis. The cooling oil passage 13 has four of the oil outlet ports 131 formed in the shaft 2 at respective locations between a rolling bearing 5 provided adjacent to a lower end of the turbo impeller 1 and the rotor 3 rigidly fixed to the shaft 2. The four oil outlet ports 131 are formed by holes each having a small inner diameter, which radially extend from the cooling oil passage 13 to open in the periphery of the shaft 2 at respective locations thereof. Two of them extend in horizontal directions as shown in FIG. 3, while the other two, not shown, extend in directions perpendicular to the surface of the sheet of FIG. 3. In addition, although a portion 2a of the shaft 2 on which the turbo impeller 1 is fixed is reduced in diameter to meet with a diameter of the turbo impeller 1, a portion 2b of same between the rolling bearing 5 and the rotor 3 where the oil outlet ports 131 are formed is fairly thick as compared with the portion 2a, to thereby secure rigidity of the shaft 2.

In the present embodiment, the oil outlet ports 131 are provided between the rolling bearing 5 arranged on the turbo impeller 1 side and the rotor 3 rigidly fixed to the shaft 2, which prevents the cooling oil discharged via the oil outlet ports 131 from passing through a clearance seal provided between the turbo impeller 1 and a housing 12 to be mixed with the laser gas, and hence from contaminating optical components of the laser as well.

Further, since the rolling bearing 5 is positioned above the oil outlet ports 131, only part of the cooling oil discharged via the oil outlet ports 131 is supplied to the rolling bearing 5. That is, only a suitable amount of the cooling oil is supplied to the rolling bearing 5 for lubrication, which prevents heat from being generated by mixing resistance, thereby attaining prolonged service life of the rolling bearing 5.

Further, since the oil outlet ports 131 can be provided at the thick portion 2b of the shaft 2, it is possible to secure sufficient rigidity of the shaft 2, which enhances reliability of the turbo blower 100.

Figure 4:
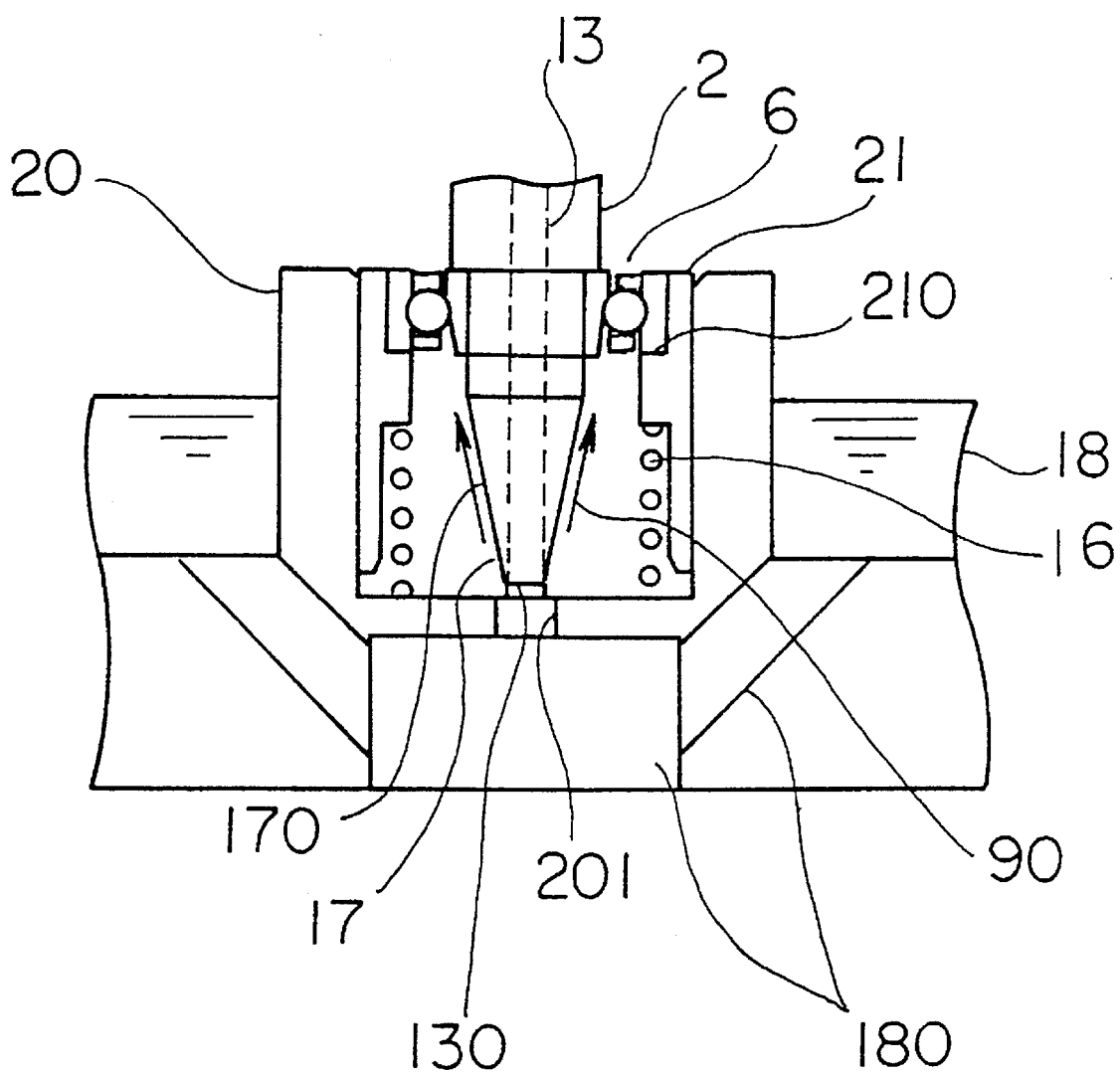
FIG. 4 is an enlarged view of an oil suction head appearing in FIG. 2.

FIG. 4 shows an oil suction head 17 and its environment appearing in FIG. 2, on an enlarged scale.

The oil suction head 17 is formed in piece with the shaft 2 at a lower end thereof. The aforementioned cooling oil passage 13 extends through the oil suction head 17 as well. The oil suction head 17 has a periphery thereof tapered along its axis up to a lower end thereof in which an oil inlet port 130 of the cooling oil passage 13 opens.

An oil sump 18 is provided immediately below the motor 30 on the lower end side of the shaft 2. Further, a shaft support 20 in the shape of a hollow cylinder is formed in piece with the oil sump 18, on the lower end side of the shaft 2 around the oil suction head 17. An oil passage 180 extends from the bottom of the oil sump 18 for communication with a through hole 201 formed in the center of the bottom of the shaft support 20. The oil in the oil sump 18 flows through the oil passage 180 and the through hole 201 to the inside of the shaft support 20 in the hollow cylindrical form. Further, the oil enters the cooling oil passage 13 via the oil inlet port 130. As a result, when the turbo blower 100 is in stoppage, the level of the cooling oil within the oil sump 18 and that of same within the cooling oil passage 13 are held identical to each other.

The shaft support 20 has a bearing sleeve 21 received therein on the inner peripheral surface thereof such that the latter is axially slidable on the former. The bearing sleeve 21 has a projected portion 210 having an upper end surface of the projected portion 210 on which abuts an outer ring of the rolling bearing 6, and a lower end surface on which abuts one end of a spring 16. The spring 16 is provided for applying pre-load to the rolling bearings 5 and 6 (see FIG. 2), with the other end thereof being fixed to the bottom of the shaft support 20, thereby pressing the projected portion 210 of the bearing sleeve 21 upward. The pressing force is sequentially transmitted therefrom in the order of the outer ring of the rolling bearing 6, the inner ring of the rolling bearing 6, the shaft 2, the inner ring of the rolling bearing 5, and the outer ring of the rolling bearing 5 (see FIG. 2), thereby holding the shaft 2 as a whole between the shaft support 20 and the housing 12 (see FIG. 2).

Referring again to FIG. 2, the housing 12 enclosing the stator 4 as part of the motor 30 is formed with oil return passages 15 which extend therethrough along the longitudinal axis of the stator 4. Further, the housing 12 is formed with coolant passages 19 which extend along the oil return passages 15, respectively.

Further, coolant passages 22 are formed through part of the housing 12 below the oil sump 18. The coolant passages 22 are provided for cooling the oil within the oil sump 18, and connected to the coolant passages 19 via passages, not shown. The coolant is circulated through a chiller, not shown, and these coolant passages 19, 22, thereby cooling the oil. The oil thus cooled cools the bearing sleeve 21, and then the bearing 6 as well, to prolong the service life of the bearing 6.

Although, in the above example, the coolant passages 22 are formed through the part of the housing 12 below the oil sump 18, this is not limitative, but the coolant passages 22 may be provided not only below the oil sump 18 but also below the oil passage 180.

Further, although, in the above example, the oil is cooled by providing the coolant passages below the oil sump 18, this is not limitative, but it may be cooled by forced cooling of the part of the housing 12 below the oil sump 18 by means of a fan or the like.

In the turbo blower 100 for lasers constructed as above, oil existing within a portion of the cooling oil passage 13 formed in the oil suction head 17 is pressed against the inner wall surface of the cooling oil passage 13 by centrifugal force generated by rotation of the shaft 2. At this time, a component of the centrifugal force is exerted on the oil in an upward direction to force it upward along the inner peripheral surface of the cooling oil passage 13. As a result, the oil is rapidly drawn upward to pass through the cooling oil passage 13 extending through the shaft 2 to be discharged via the oil outlet ports 131. Part of the cooling oil discharged is supplied to the rolling bearing 15 for lubrication thereof. The oil thus discharged returns to the oil sump 18 by way of the oil return passages 15. While passing through the oil return passages 15, the oil is cooled by the coolant flowing through the coolant passages 19. The oil returned to the oil sump 18 then flows through the oil passages 180 extending from the bottom of the oil sump 18 to the through hole 201, from which it enters the inside of the shaft support 20. Thus, when the shaft 2 rotates, the oil is constantly circulating through the path described above.

On the other hand, as shown in FIG. 4, part of the oil existing within the shaft support 20 is drawn upward along the periphery of a tapered portion 170 of the oil suction head 17 by the centrifugal force generated by rotation, and supplied to the rolling bearing 6 for lubrication thereof. An amount of the oil supplied to the rolling bearing 6 can be adjusted by an angle of the tapered portion 170 of the oil suction head 17 so as to cause a suitable amount of the oil to be supplied to the rolling bearing 6. As a result, no heat is generated from the rolling bearing 6 by mixing resistance offered by the oil, thereby making it possible to attain prolonged service life of the rolling bearing 6.

Further, the oil drawn up via the oil inlet port 130 passes through the oil passage 13, and hence the shaft 2 is cooled by the oil more effectively, thereby sufficiently cooling the rolling bearings 5 and 6 as well.

Further, according to the construction of the above embodiment, it is not necessary to provide an oil outlet port for supplying oil therefrom to the rolling bearing 6, which makes it possible to secure sufficient rigidity of the shaft 2, thereby markedly enhancing the reliability of the turbo blower.

The oil flowing through the cooling oil passage 13 is capable of dissipating or, accurately, absorbing heat generated from the shaft 2 and the rotor 3.

In addition, as the cooling oil, there is used one having a high thermal resistance and a low vapor pressure characteristic, which is difficult to evaporate, thereby preventing optical components from being contaminated by oil vapor.

As described above, since a large amount of the cooling oil is caused to flow through the shaft 2, to thereby cool the shaft 2 and the rotor 3 by the cooling oil, it is possible to effectively cool the rolling bearings 5 and 6, which in turn makes it possible to prevent the rolling bearings 5 and 6 from being damaged by a high temperature of the bearings 5 and 6 caused by heat. This makes it possible to prolong the service life of the rolling bearings 5 and 6. Further, since part of the oil is used for lubrication of the rolling bearings 5 and 6, grease becomes unnecessary. Therefore, it is possible to prevent the optical components from being contaminated by vaporization of grease. As a result, the reliability of the carbon dioxide laser can be improved as a whole.

Further, as described hereinabove, since the shaft 2 is sufficiently cooled by the oil, it becomes unnecessary to provide radiating fins on the shaft 2 for cooling same, which makes it possible to shorten the overall length of the shaft 2 by such an amount. This makes it possible to design the whole turbo blower 100 compact in size. Further, since the shaft 2 can be shortened, a second-order resonance point (critical speed) becomes higher than the maximum rotational speed of the shaft 2 normally reached, and hence it is only required to clear the first-order resonance point (critical speed) before the rotational speed of the turbo impeller 1 reaches its maximum. Therefore, the damping structure for control of vibration may be simplified. Correction of the balance of rotating elements, such as the turbo impeller 1, can be easily effected as well, which makes it possible to effect assembly and maintenance of the turbo blower more easily.

Although in the above example, as the turbo impeller 1 of the turbo blower 100 for lasers, there is used a centrifugal flow type, this is not limitative, but there may be also employed a diagonal flow type, an axial flow type, or the like.

Figure 5:
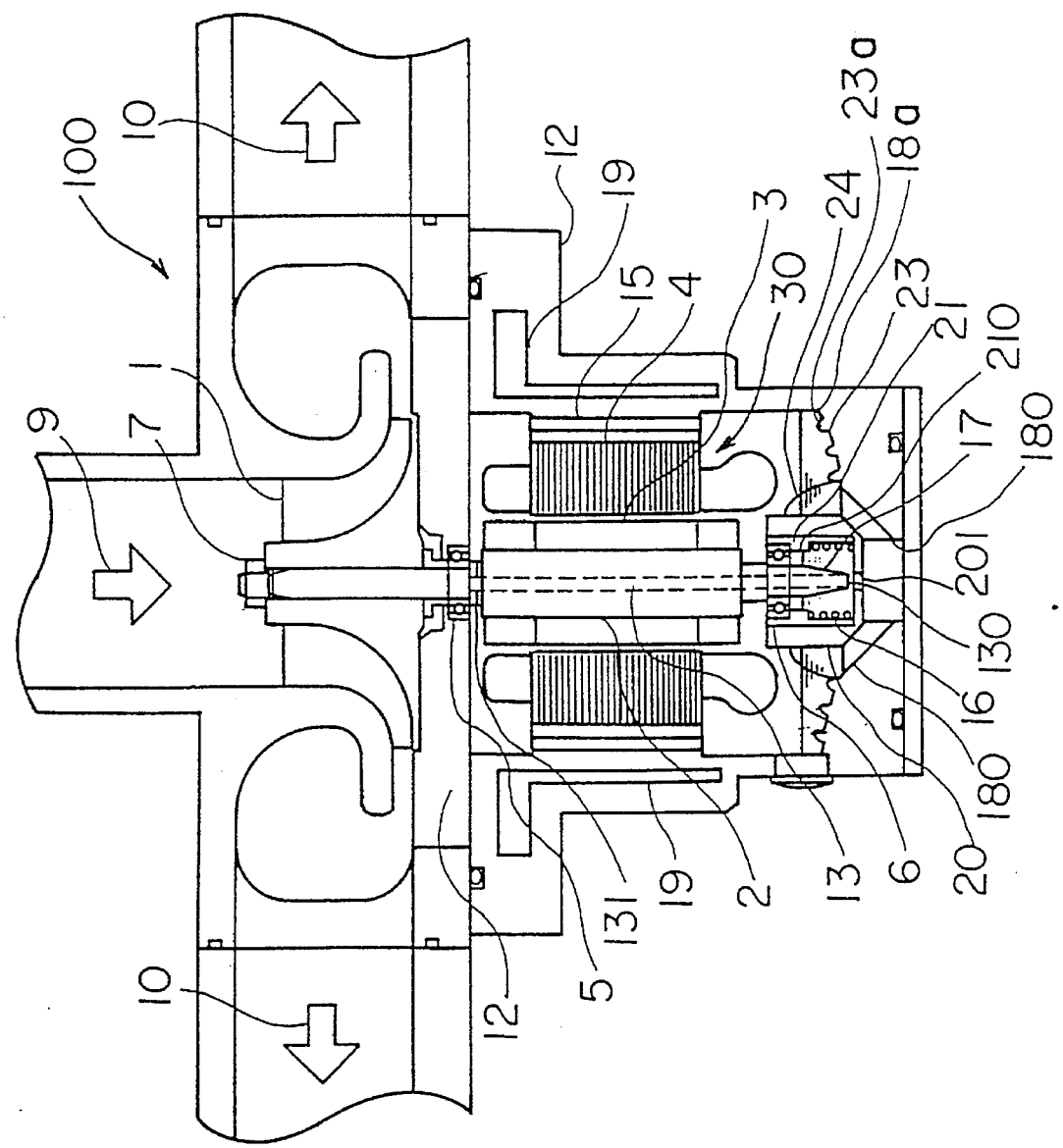
FIG. 5 is a diagram showing the construction of a turbo blower for lasers, according to a second embodiment of the invention.
Figure 6:
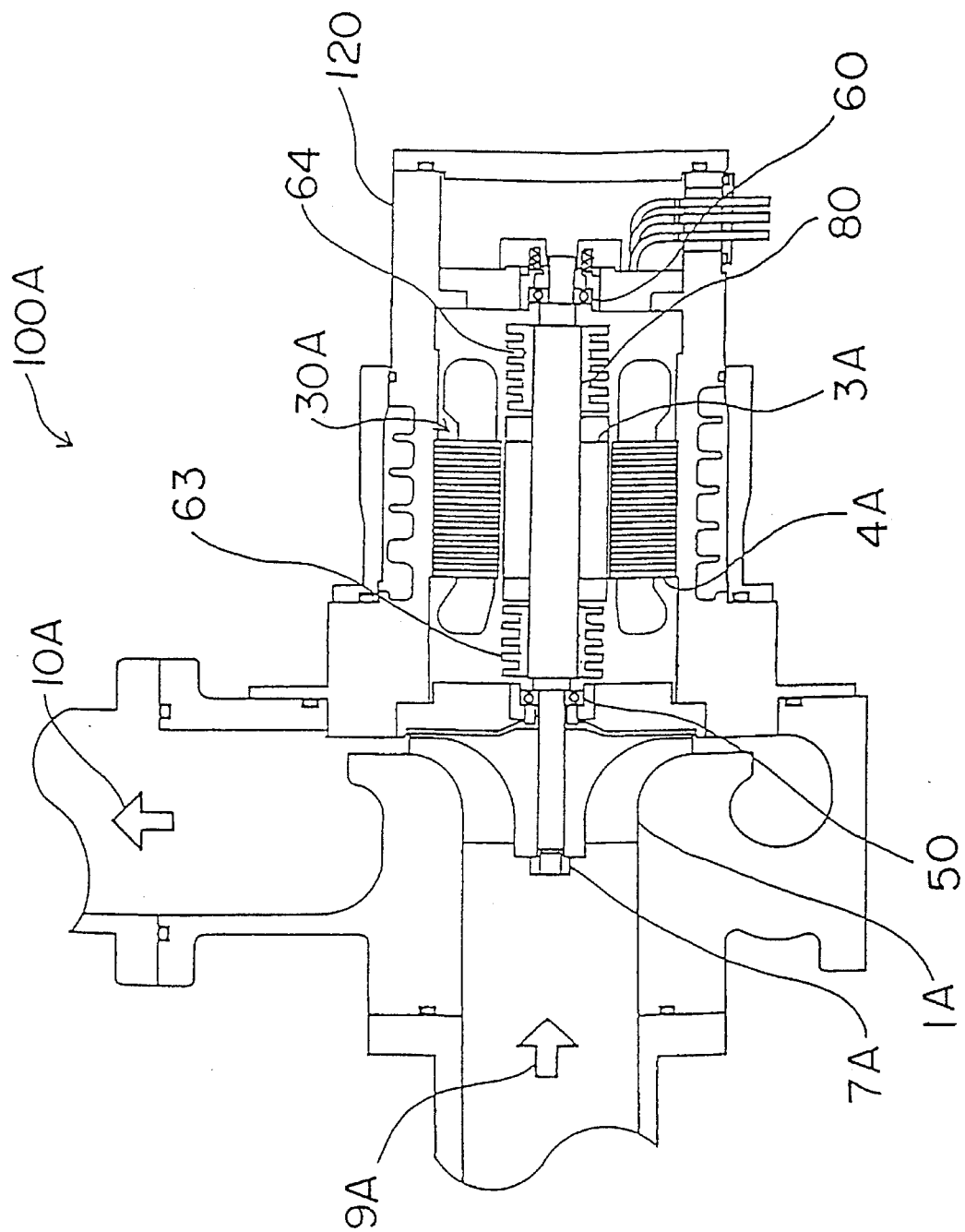
FIG. 6 is a diagram showing the construction of a conventional turbo blower for lasers.

FIG. 5 shows a turbo blower for lasers according to a second embodiment of the invention. The second embodiment is distinguished from the first embodiment (shown in FIG. 2) in the construction of an oil sump, with the remaining elements and component parts thereof being identical in construction to those of the first embodiment, detailed description of which is, therefore, omitted.

The bottom of an oil sump 18*a* in this embodiment is inclined such that it is lower around the inner circumference than around the outer circumference, and is formed with grooves 23 for trapping therein foreign matters, such as metal dusts mixed in the cooling oil. The grooves 23 are provided e.g. in a concentric manner around the center of the oil sump 18*a* for trapping or capturing the metal dusts and the like which are settled. Further, the oil sump 18*a* is provided with a mesh filter 24 made of stainless, in addition to the grooves 23. The mesh filter 24 extends between the shaft support 20 and the oil passages 180 in a concentric and conical form around the shaft support 20, whereby the oil is caused to necessarily pass through the mesh filter 24 before it flows into the oil passage 180, to thereby catch small dusts which will float on the oil.

Thus, the grooves 23 provided at the bottom of the oil sump 18*a* can suitably trap therein heavy foreign matters, such as metal dusts, out of foreign matters mixed in the oil. Since such heavy foreign matters can cause much damage to the shaft, it is possible to markedly improve the reliability of the bearings by trapping or capturing them. Further, projected portions 23*a* of the grooves 23 serve as cooling fins, and accelerate cooling of the oil.

Further, since the oil is caused to pass through the mesh filter 24 before it flows into the oil passages 180, light dusts having a specific gravity equal to or smaller than that of the oil can be caught by the mesh filter 24. The mesh filter 24, which is relatively wide-meshed filter means, is used because it is appropriate to catch only foreign matters which can damage the rolling bearings 5 and 6. Conversely, if narrow-meshed filter means is used, much labor will become necessary in maintenance for replacement of loaded filters.

As described above, according to the present embodiment, a large amount of the cooling oil is caused to flow through the shaft, to thereby cool the shaft and the rotor by means of the cooling oil. Therefore, it is possible to effectively cool a pair of bearings supporting the shaft, which in turn makes it possible to prevent the bearings from being damaged by a high temperature caused by the heat. This makes it possible to prolong the service life of the rolling bearings.

Further, since part of the oil is used for lubrication of the bearings, grease becomes unnecessary. Therefore, it is possible to prevent the optical components from being contaminated by vaporization of grease. As a result, the reliability of the carbon dioxide laser can be improved as a whole.

Further, as described hereinabove, since the bearings are sufficiently cooled by the cooling oil, it becomes unnecessary to provide radiating fins on the shaft for cooling the bearings, which permits reduction of the overall length of the shaft. This makes it possible to design the whole turbo blower compact in size.

Further, since the shaft can be shortened, it is only required to clear the first-order resonance point (critical speed) before the rotational speed of the turbo impeller reaches its maximum. Therefore, the damping structure for control of vibration can be simplified. Correction of the balance of rotating elements, such as the turbo impeller, can be easily effected, which makes it possible to effect assembly and maintenance of the turbo blower more easily.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A turbo blower for a laser, including a turbo impeller, a shaft having said turbo impeller fixed on one end thereof, a pair of bearings for rotatably supporting said shaft, and a motor for causing rotation of said shaft, said turbo blower comprising:

a cooling oil passage formed through said shaft substantially along the axis thereof; and an oil sump arranged on one end side of said cooling oil passage such that said one end of said cooling oil passage is in contact with cooling oil existing within said oil sump.

2. A turbo blower for a laser according to claim 1, wherein said shaft is arranged substantially vertically, said oil sump being arranged on a lower end side of said cooling oil passage such that a centrifugal force generated by rotation of said shaft causes said cooling oil to be drawn upward to pass from a lower end of said shaft through said cooling oil passage formed therethrough to an oil outlet port formed in said oil shaft.

3. A turbo blower for a laser according to claim 1, wherein part of said cooling oil is used as lubricating oil for lubricating said pair of bearings.

4. A turbo blower for a laser according to claim 1, wherein said cooling oil is an oil having a high thermal resistance and at the same time a low vapor pressure characteristic.

5. A turbo blower for a laser, including a turbo impeller, a shaft supporting said turbo impeller, an oil passage formed through said shaft for causing an oil to pass therethrough by a centrifugal force generated by rotation of said shaft, and bearings rotatably supporting said shaft, characterizing in that said oil passage has an outlet port provided in said shaft, in the vicinity of one of said bearings located on said turbo impeller side of said shaft, and at the same time on one side of said one of said bearings remote from said turbo impeller.

6. A turbo blower for a laser according to claim 5, including a rotor fixed on said shaft, said rotor forming part of a motor for driving said shaft for rotation, wherein said outlet port of said oil passage is provided between said one of said bearings and said rotor.

7. A turbo blower for a laser according to claim 5, wherein part of said oil discharged via said outlet port of said oil passage is supplied to said one of said bearings for lubrication thereof.

8. A turbo blower for a laser, including a turbo impeller, a shaft supporting said turbo impeller, and bearings rotatably supporting said shaft, said bearings being lubricated by a lubricating oil supplied by a centrifugal force generated by rotation of said shaft, said turbo blower comprising:

an oil suction head formed at one end of said shaft, in one piece with said shaft;

a tapered portion formed around the periphery thereof such that said oil suction head becomes thinner in the direction of an open end thereof; and an oil sump provided such that said suction oil head is in contact with oil held therein;

at least one of said bearings being provided above said oil suction head of said shaft for rotatably supporting said shaft.

9. A turbo blower for a laser according to claim 8, wherein said shaft is arranged substantially vertically, said oil suction head being provided on a lower end side of said shaft for rotation in unison with said shaft to draw up said oil along a peripheral surface of said tapered portion by said centrifugal force generated by said rotation of said suction head, to thereby supply said oil as said lubricating oil to said bearings.

10. A turbo blower for a laser according to claim 8, wherein said lubricating oil is supplied to said bearings only via said peripheral surface of said tapered portion.

11. A turbo blower for a laser according to claim 8, including a small oil chamber in the form of a hollow cylinder which communicates with said oil sump via the bottom thereof, wherein said oil suction head draws up said oil existing within said small oil chamber via said tapered portion.

12. A turbo blower for a laser, including a turbo impeller, a shaft having said turbo impeller fixed on one end thereof, bearings rotatably supporting said shaft, and an oil sump holding an oil, said bearings being supplied with said oil held within said oil sump for lubrication thereof, said turbo blower comprising:

a coolant passage provided in the vicinity of said oil sump for cooling said oil held within said oil sump.

13. A turbo blower for a laser according to claim 12, including a housing, wherein said coolant passage is formed through part of said housing below said oil sump such that said coolant passage extends along said oil sump.

14. A turbo blower for a laser, including a turbo impeller, a shaft having said turbo impeller fixed on one end thereof, bearings rotatably supporting said shaft, an oil sump holding an oil, and a housing, said bearings being supplied with said oil held within said oil sump for lubrication thereof, characterizing in that part of said housing enclosing said oil sump is air-cooled to thereby cool said oil within said oil sump.

15. A turbo blower for a laser according to claim 14, wherein said housing also serves as a bearing sleeve support for supporting a bearing sleeve supporting one of said bearings, arranged on a portion of said shaft at a location close to a lower end of said shaft.

16. A turbo blower for a laser, including a turbo impeller, a shaft having said turbo impeller fixed on one end thereof, bearings rotatably supporting said shaft, and an oil sump holding an oil, said bearings being supplied with said oil held within said oil sump for lubrication thereof, said turbo blower comprising;

grooves formed at the bottom of said oil sump for trapping a foreign matter contained in said oil, said grooves serving as cooling fins at the same time.

17. A turbo blower for a laser according to claim 16, wherein said grooves are formed at the bottom of said oil sump in a concentric manner.

18. A turbo blower for a laser according to claim 16, including an oil filter in a conical form provided in said oil sump in a concentric manner for use in combination with said grooves.

* * * * *

UNITED STATES PATENT AND TRADEMARK OFFICE
CERTIFICATE OF CORRECTION

PATENT NO. : 5,461,636
DATED : October 24, 1995
INVENTOR(S) : Karube et al.

It is certified that error appears in the above-indentified patent and that said Letters Patent is hereby corrected as shown below:

On the Title page, item [30] Foreign Application Priority Data
    line 1, delete "00";
    line 2, delete "00";
    line 3, delete "00";
    line 4, delete "00";
    line 5, delete "00".
Col. 1, line 6, before "1" delete "b".

Signed and Sealed this

Ninth Day of January, 1996

Attest:

BRUCE LEHMAN

*Attesting Officer*      *Commissioner of Patents and Trademarks*